US009825405B1

United States Patent
Chou et al.

(10) Patent No.: US 9,825,405 B1
(45) Date of Patent: Nov. 21, 2017

(54) PUSH-PUSH FIXING STRUCTURE AND CHIP DETECTING MODULE

(71) Applicant: GETAC TECHNOLOGY CORPORATION, Hsinchu County (TW)

(72) Inventors: Hsin-Chih Chou, Taipei (TW); Juei-Chi Chang, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 0 days.

(21) Appl. No.: 15/472,167

(22) Filed: Mar. 28, 2017

(51) Int. Cl.
| | |
|---|---|
| *H01R 13/62* | (2006.01) |
| *H01R 13/635* | (2006.01) |
| *H01R 13/631* | (2006.01) |
| *H01R 12/71* | (2011.01) |
| *H01R 13/629* | (2006.01) |

(52) U.S. Cl.
CPC ......... *H01R 13/635* (2013.01); *H01R 12/712* (2013.01); *H01R 13/631* (2013.01); *H01R 13/62905* (2013.01)

(58) Field of Classification Search
CPC ........................ H01R 13/635; H01R 13/62905
USPC ......................................................... 439/159
See application file for complete search history.

(56) References Cited

U.S. PATENT DOCUMENTS

| | | | | |
|---|---|---|---|---|
| 6,875,033 B2 * | 4/2005 | Sato | ................... | G06K 13/0825 439/159 |
| 7,422,485 B2 * | 9/2008 | Yu | ........................ | G06K 7/0021 439/159 |
| 7,637,759 B2 * | 12/2009 | Kobayashi | ............. | G06K 13/08 439/153 |
| 8,902,602 B2 * | 12/2014 | Wang | ................... | H05K 7/1461 361/737 |
| 2005/0208804 A1 * | 9/2005 | Kikuchi | ............... | H01R 13/635 439/159 |
| 2009/0075507 A1 * | 3/2009 | Chikashige | .......... | H01R 13/635 439/159 |
| 2009/0246993 A1 * | 10/2009 | Yu | ........................ | H01R 13/633 439/159 |
| 2010/0159724 A1 * | 6/2010 | Ida | ........................ | G06K 13/08 439/159 |
| 2011/0039433 A1 * | 2/2011 | Tsai | ....................... | G06K 13/08 439/159 |
| 2011/0136360 A1 * | 6/2011 | Zhu | ..................... | G06K 13/0837 439/159 |

(Continued)

*Primary Examiner* — Tho D Ta

(57) ABSTRACT

A push-push fixing structure includes a base, a guiding element, a flexible element and a locating element. The guiding element is disposed on the base, includes a first guiding groove, a second guiding groove and a locating portion. The first guiding groove is connected to the second guiding groove, the locating portion is located at a junction of the first guiding groove and the second guiding groove. The flexible element is disposed on the base and pressed against the guiding element. The locating element has a first end portion and second end portion opposite to each other. The first end portion is disposed on the base. The second end portion is slidably disposed in the first guiding groove and the second guiding groove of the guiding element. When the guiding element is moved by push force, the second end portion of the locating element slides along the first guiding groove and the second guiding groove, and locates at the locating portion.

20 Claims, 9 Drawing Sheets

(56) References Cited

U.S. PATENT DOCUMENTS

| | | | |
|---|---|---|---|
| 2011/0230072 A1* | 9/2011 | Yu | H01R 12/7094 |
| | | | 439/159 |
| 2013/0005168 A1* | 1/2013 | Ye | G06K 13/08 |
| | | | 439/159 |
| 2013/0337622 A1* | 12/2013 | Yang | H01L 27/0629 |
| | | | 438/238 |

* cited by examiner

PUSH-PUSH FIXING STRUCTURE AND CHIP DETECTING MODULE

BACKGROUND OF THE INVENTION

Field of the Invention

The present invention relates to a push-push fixing structure and a chip detecting module.

Description of the Prior Art

A conventional electronic device is usually equipped with a chip detecting module which a chip is to be connected to. The commercially available chip detecting module is a modularized product which integrates a chip receptacle and a circuit board. The chip receptacle comes with a chip securing/ejecting mechanism. The electronic device must adapt to modularized dimensions and specifications of the chip detecting module for the sake of spatial arrangement, albeit at the expense of flexibility of spatial arrangement.

Due to the coexistence of the chip receptacle and the circuit board in the chip detecting module, the electronic device must be big enough to accommodate the chip receptacle and the circuit board of the chip detecting module to be mounted on the electronic device. As a result, the electronic device cannot be downsized.

The chip receptacle of the modularized chip detecting module comes with fixed dimensions and specifications. If the dimensions and specifications of the chip receptacle of the chip detecting module to be mounted on the electronic device fail to meet user needs, the chip detecting module will have to be changed in its entirety. The replacement of the chip detecting module is inconvenient, and may even be impossible because of spatial arrangement-related limitation. Therefore, the prior art still has room for improvement.

SUMMARY OF THE INVENTION

In the embodiment, a push-push fixing structure comprises a base, a guiding element, a resilient component and a positioning element. The guiding element is disposed in the base and comprises a first guiding groove, a second guiding groove and a positioning portion. The first guiding groove is connected to the second guiding groove. The positioning portion is located at the junction of the first guiding groove and the second guiding groove. The resilient component is disposed on the base and presses against the guiding element. The positioning element has a first end portion and a second end portion opposing the first end portion. The first end portion is disposed on the base. The second end portion is slidably disposed in the first guiding groove and the second guiding groove of the guiding element. When the guiding element is moved under a push force to an engagedly fixed position, the second end portion of the positioning element slides along the first guiding groove and the second guiding groove until it becomes positioned at the positioning portion.

Therefore, the push-push fixing structure in the embodiment is independent of the circuit board; hence, not only are the circuit board and the push-push fixing structure each disposed freely at a required position or device, but the guiding element can also be pushed so that the guiding element is definitely guided in its motion until it is positioned at the positioning element or freed.

DETAILED DESCRIPTION OF THE EMBODIMENTS

Figure 1:
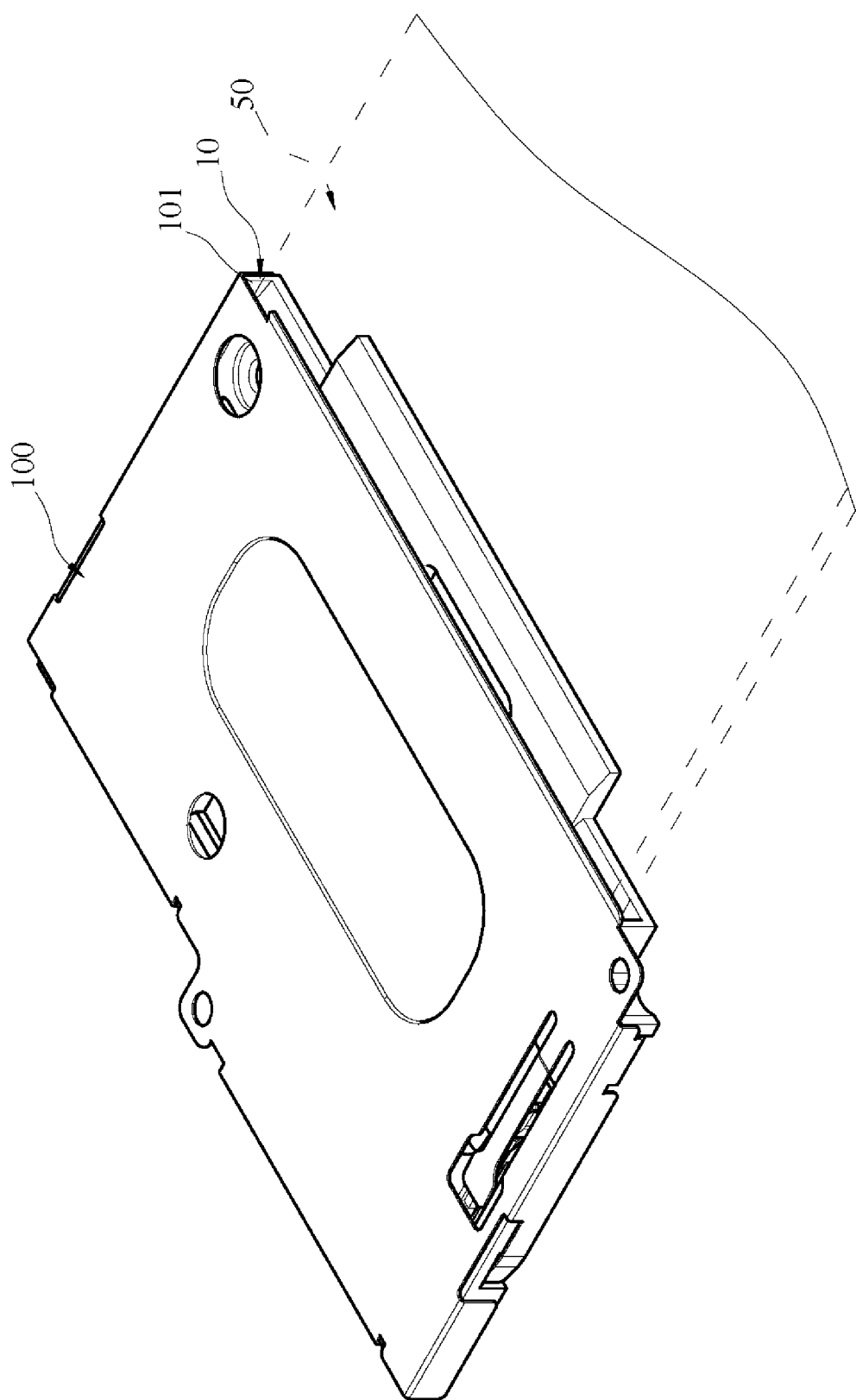
FIG. 1 is a perspective view of a push-push fixing structure assembled according to an embodiment of the present invention.

Referring to FIG. 1, there is shown a perspective view of a push-push fixing structure assembled according to an embodiment of the present invention. The push-push fixing structure in the embodiment comprises a base 10. The base 10 and a cover 100 are put together. The base 10 and one of the sides of the cover 100 jointly define a slot 101 which a chip 50 is inserted into.

Figure 2:
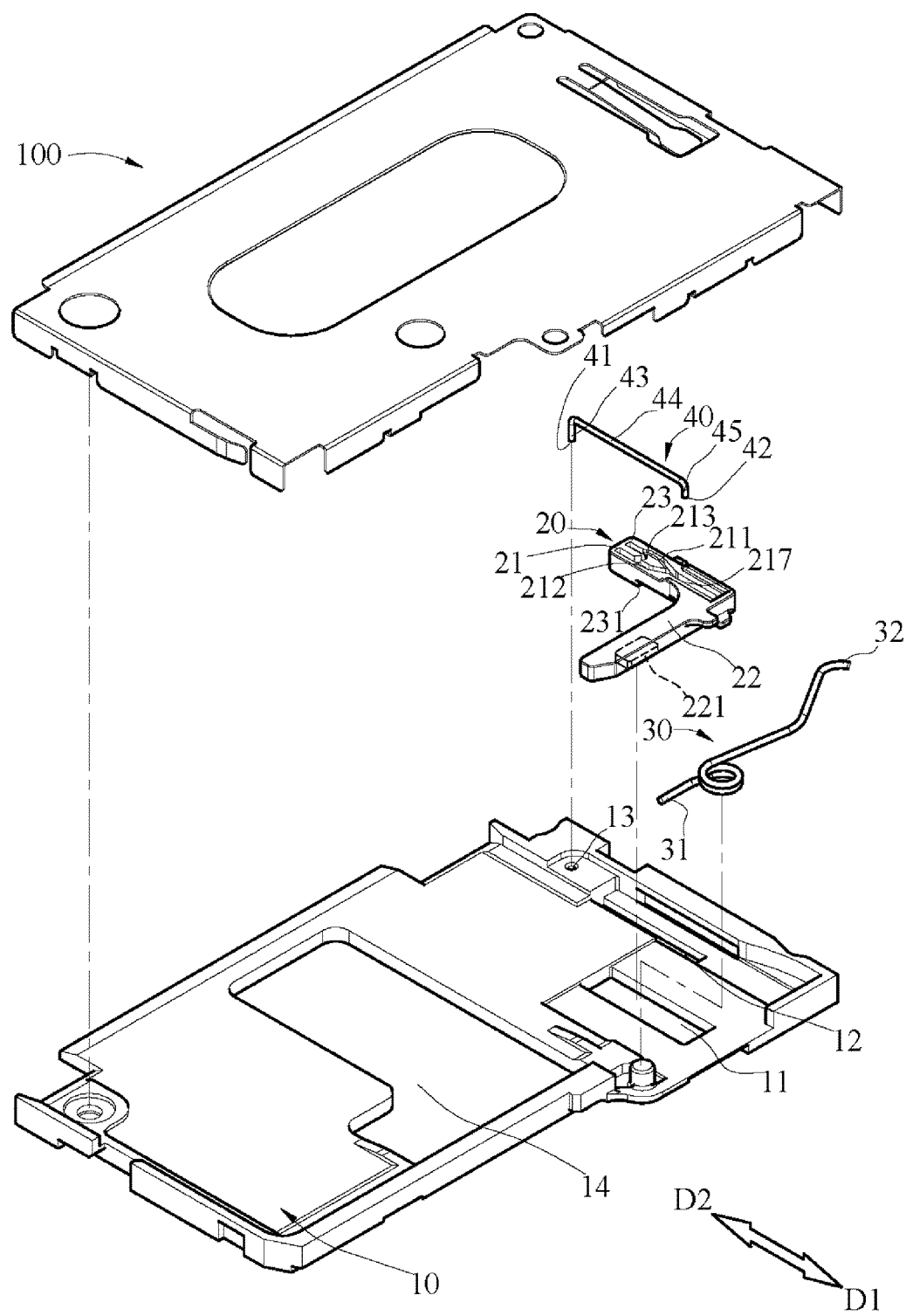
FIG. 2 is an exploded view of the push-push fixing structure according to the embodiment of the present invention.

Referring to FIG. 2, there is shown an exploded view of the push-push fixing structure according to the embodiment of the present invention. As shown in FIG. 2, the push-push fixing structure comprises the base 10, a guiding element 20, a resilient component 30 and a positioning element 40. The guiding element 20 is slidably disposed in the base 10 and comprises a guiding groove 21. The resilient component 30 is disposed on the base 10 and presses against the guiding element 20. One end of the positioning element 40 is disposed on the base 10. The other end of the positioning element 40 is received in the guiding groove 21. Once the chip 50 begins moving in a moving direction D1 so as to be inserted into the slot 101 between the base 10 and the cover 100, not only will the guiding element 20 be moved, under a push force, from an ejecting position A shown in FIG. 3 to an engagedly fixed position B shown in FIG. 4, but the positioning element 40 and the guiding element 20 will also jointly produce a positioning effect whereby the chip 50 is positioned at the engagedly fixed position B.

Figure 3:
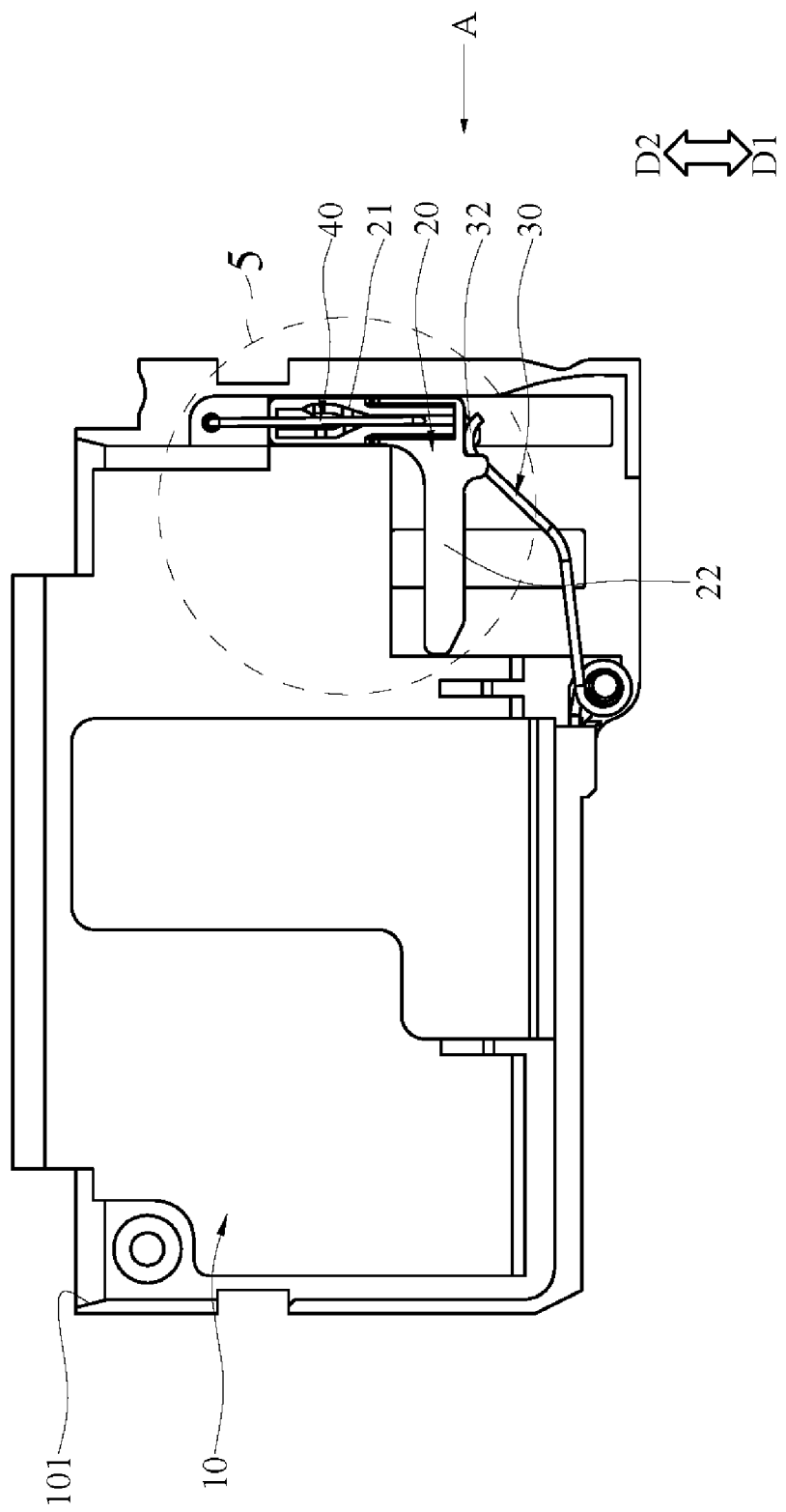
FIG. 3 is a top view of the push-push fixing structure assembled according to the embodiment of the present invention.
Figure 4:
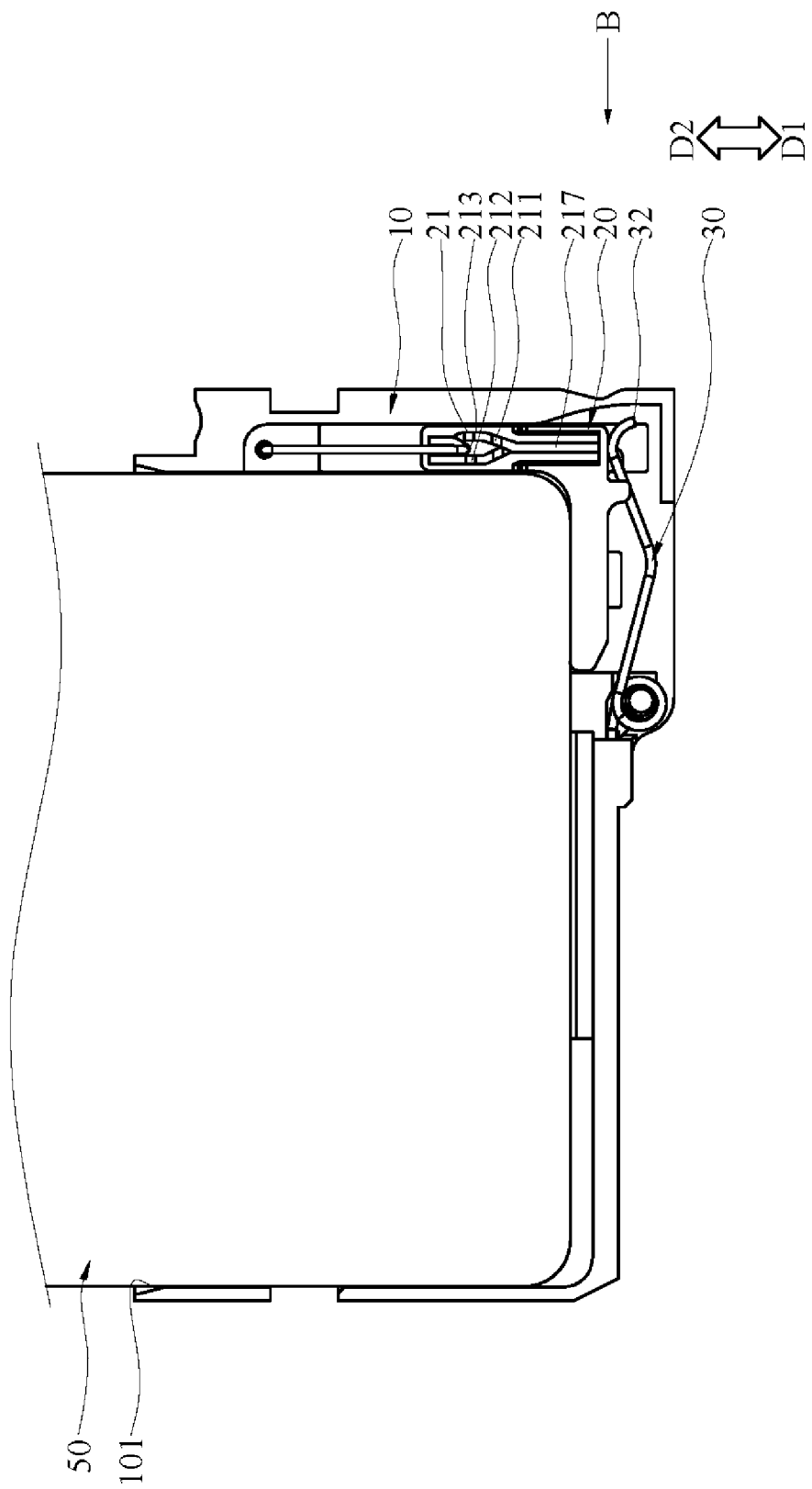
FIG. 4 is a top view of the push-push fixing structure assembled in another way according to the embodiment of the present invention.

Referring to FIG. 3 and FIG. 4, the guiding groove 21 of the guiding element 20 comprises a first guiding groove 211, a second guiding groove 212 and a positioning portion 213. The first guiding groove 211 is connected to the second guiding groove 212. The positioning portion 213 is located at the junction of the first guiding groove 211 and the second guiding groove 212. Motion of the guiding element 20 causes the positioning element 40 to slide along the guiding groove 21. Upon its arrival at the positioning portion 213, the positioning element 40 produces a positioning effect and thus becomes positioned in place at the engagedly fixed position B.

Referring to FIG. 2, in the embodiment, the guiding element 20 comprises a first driving segment 22 and a second driving segment 23. One end of the first driving segment 22 adjoins one end of the second driving segment 23. The extending direction of the first driving segment 22 and the extending direction of the second driving segment 23 are perpendicular to each other. The guiding groove 21 is disposed on the second driving segment 23.

The base 10 comprises a first guiding opening 11 and a second guiding opening 12. The extending directions of the first guiding opening 11 and the second guiding opening 12 are parallel to the moving direction D1.

Referring to FIG. 2, the first driving segment 22 further comprises a first guiding block 221 slidably received in the first guiding opening 11, whereas the second driving segment 23 further comprises a second guiding block 231 slidably received in the second guiding opening 12. Therefore, the guiding element 20 moves in the extending directions of the first guiding opening 11 and the second guiding opening 12 under an external force.

Referring to FIG. 2 and FIG. 3, the resilient component 30 comprises a first end 31 and a second end 32. The first end 31 is fixed to the base 10. The second end 32 presses against the guiding element 20. The resilient component 30 is disposed pivotally on the base 10 and about a point between the first end 31 and the second end 32. The resilient component 30 pushes the guiding element 20 in a direction opposite the moving direction D1, that is, an ejecting direction D2. Referring to FIG. 3, in the embodiment, the second end 32 of the resilient component 30 presses against the first driving segment 22 of the guiding element 20. The second end 32 of the resilient component 30 presses against the guiding element 20 whenever the guiding element 20 is not subjected to any other external force, thereby allowing the guiding element 20 to move to a position above the base 10 and near the slot 101.

Referring to FIG. 2 and FIG. 3, the positioning element 40 has a first end portion 41 and a second end portion 42 opposing the first end portion 41. The first end portion 41 is fixed to the base 10. The second end portion 42 is received in the guiding groove 21 of the guiding element 20. In the embodiment, the base 10 further comprises a receiving hole 13, whereas the positioning element 40 comprises a first pin 43, a middle segment 44 and a second pin 45. One end of the first pin 43 and one end of the second pin 45 are connected to two ends of the middle segment 44, respectively. The first end portion 41 is disposed at the other end of the first pin 43. The second end portion 42 is disposed at the other end of the second pin 45. An included angle is defined between the middle segment 44 and each of the first pin 43 and the second pin 45. The first pin 43 is of a longer length than the second pin 45. The first pin 43 of the positioning element 40 is inserted into the receiving hole 13 so that the first end portion 41 is fixed to the base 10. The second pin 45 is received in the guiding groove 21.

Once the guiding element 20 moves under an external force, the guiding groove 21 of the guiding element 20 will correspond in position to the second end portion 42 of the positioning element 40. The shape of the positioning element 40 is conducive to a slight swing of the second pin 45 relative to the first pin 43. Therefore, the second end portion 42 of the positioning element 40 slides between the first guiding groove 211, the second guiding groove 212 and the positioning portion 213 of the guiding groove 21.

In the embodiment, once the guiding element 20 begins moving in the moving direction D1 from the ejecting position A under an external force, the second end portion 42 of the positioning element 40 will move along the first guiding groove 211 to the positioning portion 213 so that the second end portion 42 of the positioning element 40 will be positioned at the positioning portion 213 and thus located at the engagedly fixed position B.

Once the guiding element 20 at the engagedly fixed position B is moved again under a push force, the guiding element 20 will press against the resilient component 30 so that the second end 32 of the resilient component 30 will be pressed and deformed. Once the second end 32 of the resilient component 30 is pressed and deformed, the guiding element 20 will move again in the moving direction D1. Due to the motion of the guiding element 20, the second end portion 42 of the positioning element 40 leaves the positioning portion 213 for the second guiding groove 212. With the positioning element 40 leaving the positioning portion 213, the guiding element 20 is no longer fixed in place; hence, the guiding element 20 is moved again to the ejecting position A under the restoring force of the resilient component 30.

Figure 5:
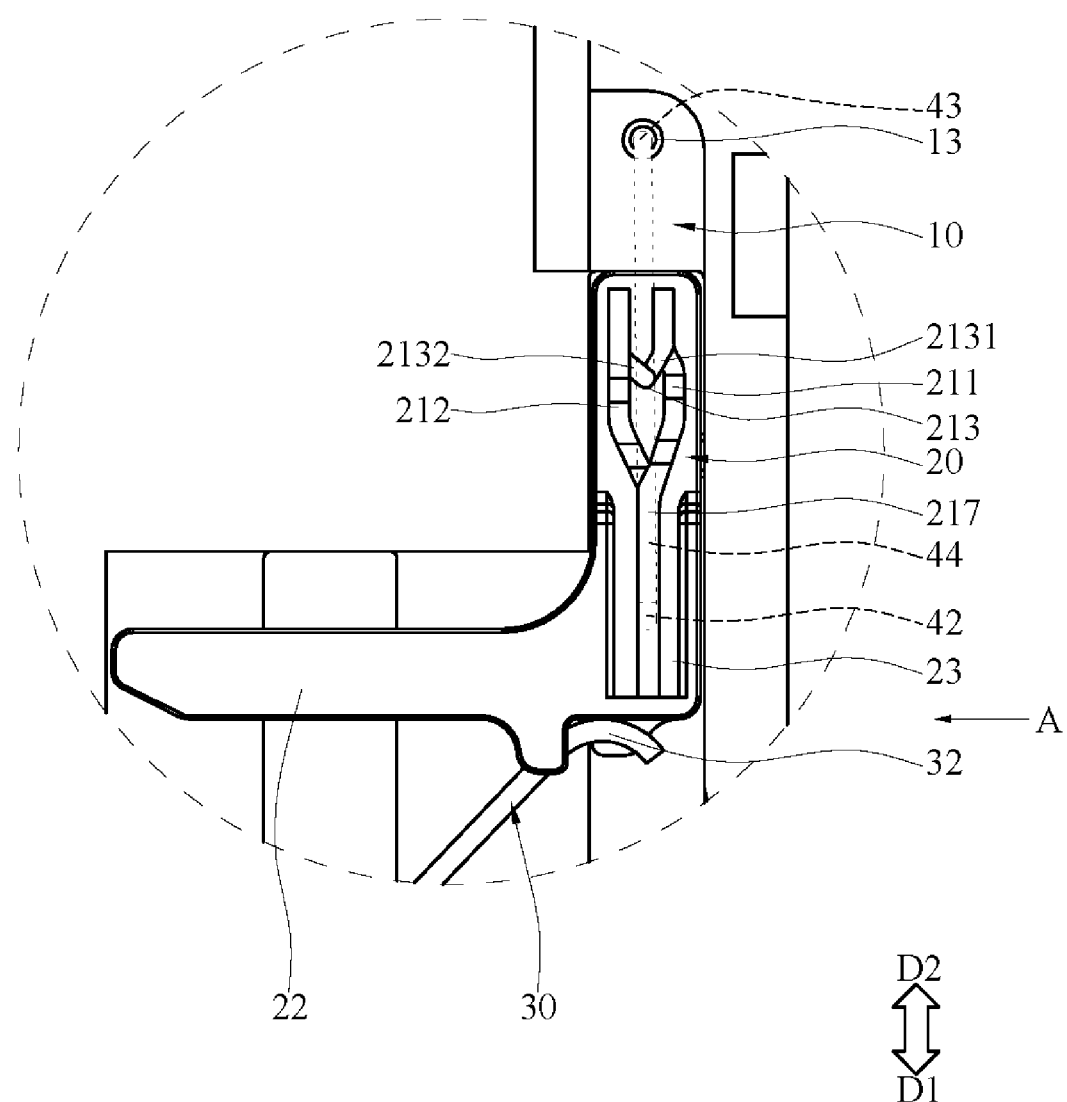
FIG. 5 is a partial enlarged view of the encircled part 5 of FIG. 3.

Referring to FIG. 5, to ensure the positioning effect of the positioning portion 213 between the first guiding groove 211 and the second guiding groove 212, the positioning portion 213 further comprises a first guiding segment 2131 and a second guiding segment 2132. The first guiding segment 2131 adjoins the first guiding groove 211. The second guiding segment 2132 adjoins the second guiding groove 212. An included angle is defined between the extending direction of the first guiding segment 2131 and the extending direction of the first guiding groove 211. An included angle is defined between the extending direction of the second guiding segment 2132 and the extending direction of the second guiding groove 212. An included angle is defined between the extending direction of the first guiding segment 2131 and the extending direction of the second guiding segment 2132. Therefore, due to the motion of the guiding element 20, the positioning element 40 leaves the first guiding groove 211 and then takes a turn before entering the first guiding segment 2131 of the positioning portion 213. The bend between the first guiding groove 211 and the first guiding segment 2131 prevents the positioning element 40 from backtracking but enables the positioning element 40 to be easily positioned at the positioning portion 213. Likewise, after the positioning element 40 has left the positioning portion 213 for the second guiding groove 212 through the second guiding segment 2132, the included angle between the second guiding segment 2132 and the second guiding groove 212 prevents the positioning element 40 from backtracking but frees the positioning element 40 smoothly.

In the embodiment, the included angle between the extending direction of the first guiding segment 2131 and the extending direction of the second guiding segment 2132 is less than 90 degrees to ensure that the positioning element 40 is received in the positioning portion 213 to thereby produce an enclosing, limiting effect. In the embodiment, the included angle between the extending direction of the first guiding segment 2131 and the moving direction D1 is less than 45 degrees, whereas the included angle between the extending direction of the second guiding segment 2132 and the moving direction D1 is larger than 45 degrees. Therefore, upon its entry into the positioning portion 213, the positioning element 40 cannot escape from the first guiding segment 2131 but can easily escape from the second guiding segment 2132.

Figure 6:
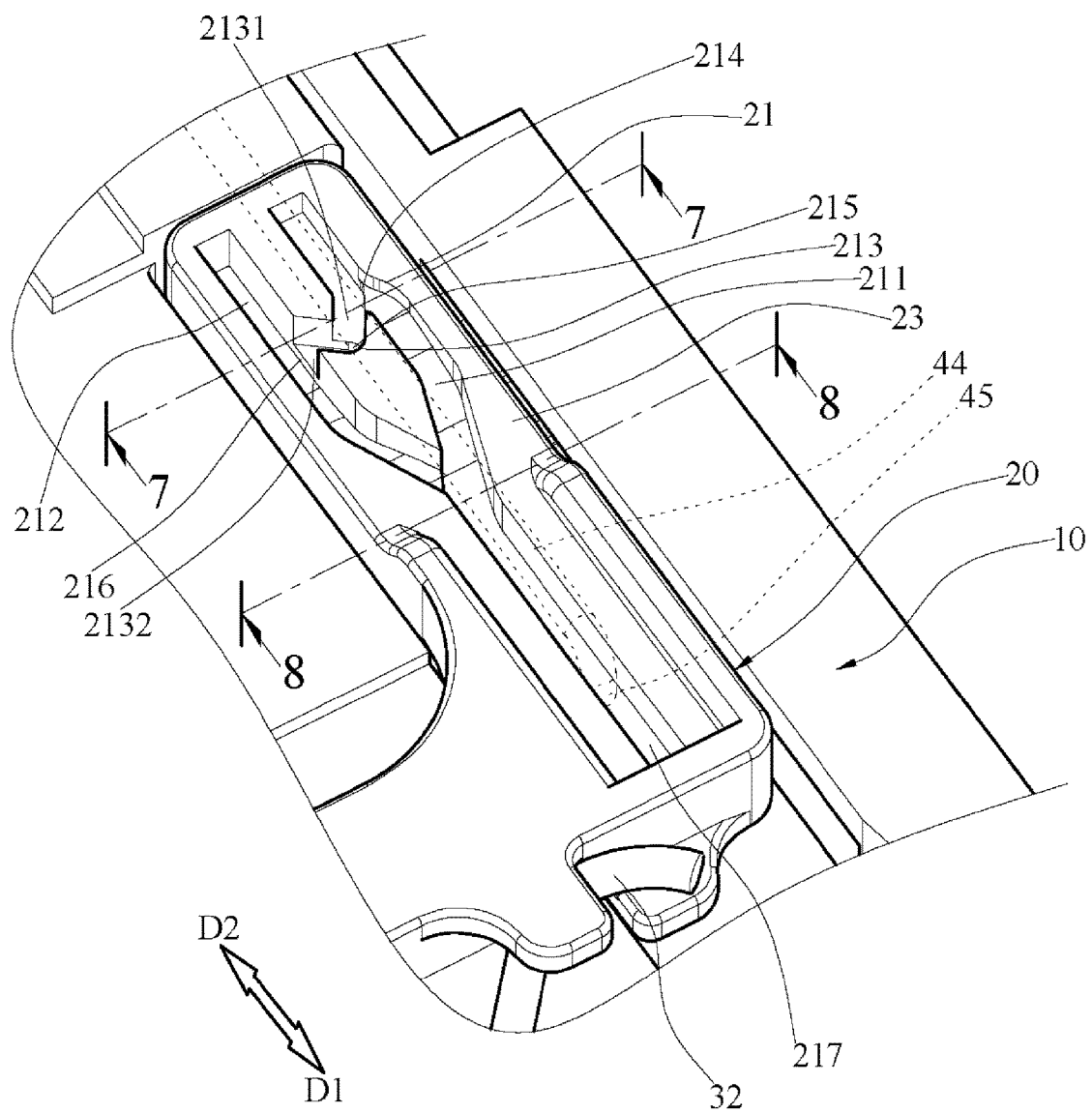
FIG. 6 is a partial enlarged perspective view of the push-push fixing structure according to the embodiment of the present invention.
Figure 7:
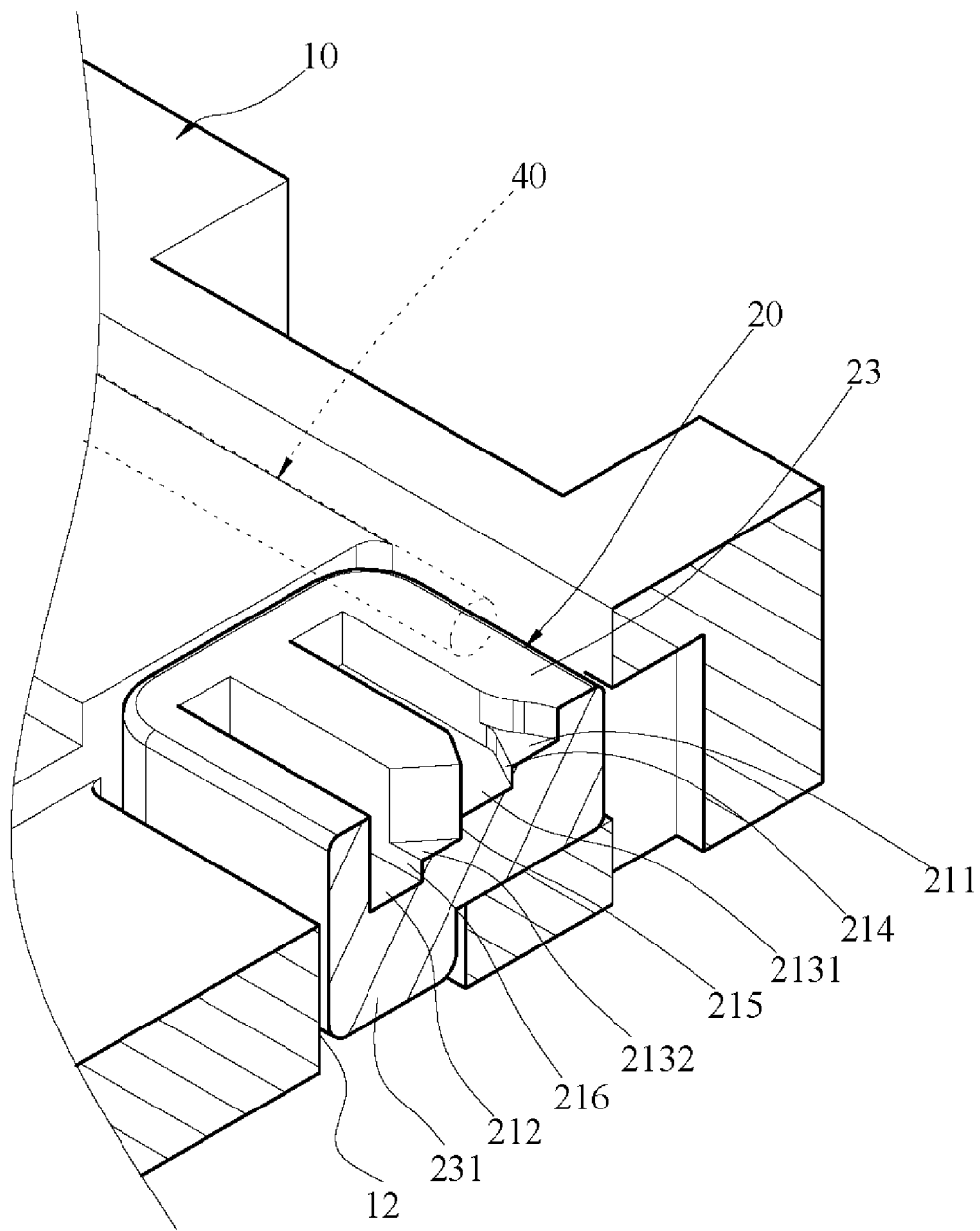
FIG. 7 is a cross-sectional view taken along line 7-7 of FIG. 6.

Referring to FIG. 6 and FIG. 7, the guiding groove 21 of the guiding element 20 further comprises a first differential segment 214. The first differential segment 214 is disposed between the first guiding groove 211 and the first guiding segment 2131. The junction of the first guiding segment 2131 and the first differential segment 214 is lower than the junction of the first guiding groove 211 and the first differential segment 214. Therefore, as soon as the guiding element 20 moves in the moving direction D1, the positioning element 40 moves along the first guiding groove 211 into the first guiding segment 2131. Once the positioning element 40 enters the first guiding segment 2131, the first differential segment 214 will be capable of stopping the positioning element 40 and thus preventing the positioning element 40 from passing the first differential segment 214 to otherwise backtrack and return to the first guiding groove 211, thereby ensuring the steady entry of the positioning element 40 into the positioning portion 213. Furthermore, the second end portion 42 of the positioning element 40 is restricted to one-way movement from the first guiding groove 211 into the positioning portion 213 in the course of the transit of the guiding element 20 from the ejecting position A to the engagedly fixed position B.

Referring to FIG. 6 and FIG. 7, the guiding groove 21 of the guiding element 20 further comprises a second differential segment 215. The second differential segment 215 is disposed between the first guiding segment 2131 and the second guiding segment 2132. The junction of the second guiding segment 2132 and the second differential segment 215 is lower than the junction of the first guiding segment 2131 and the second differential segment 215. Therefore, as soon as the guiding element 20 moves in the moving direction D1, the positioning element 40 moves along the first guiding segment 2131 into the second guiding segment 2132. Once the positioning element 40 enters the second guiding segment 2132, the second differential segment 215 will be capable of stopping the positioning element 40 and thus preventing the positioning element 40 from passing the second differential segment 215 to otherwise backtrack and return to the first guiding segment 2131, thereby ensuring the steady entry of the positioning element 40 into the positioning portion 213.

Referring to FIG. 6 and FIG. 7, the guiding groove 21 of the guiding element 20 further comprises a third differential segment 216. The third differential segment 216 is disposed between the second guiding groove 212 and the second guiding segment 2132. The junction of the second guiding groove 212 and the third differential segment 216 is lower than the junction of the second guiding segment 2132 and the third differential segment 216. Therefore, as soon as the guiding element 20 moves away from the engagedly fixed position B in the moving direction D1 under an external force, the third differential segment 216 enables the second end portion 42 of the positioning element 40 to move from the second guiding segment 2132 to the second guiding groove 212. Upon the entry of the positioning element 40 into the second guiding groove 212, the third differential segment 216 is capable of stopping the positioning element 40 and thus preventing the positioning element 40 from passing the third differential segment 216 to otherwise backtrack and return to the second guiding segment 2132, thereby ensuring the smooth release of the guiding element 20. The second end portion 42 of the positioning element 40 is restricted to one-way movement from the positioning portion 213 into the second guiding groove 212 as soon as the guiding element 20 moves from the engagedly fixed position B to the ejecting position A, thereby defining the path of movement of the positioning element 40.

Referring to FIG. 5 and FIG. 6, the guiding groove 21 of the guiding element 20 further comprises a third guiding groove 217. The third guiding groove 217 connects the first guiding groove 211 and the second guiding groove 212. The first guiding groove 211, the second guiding groove 212 and the third guiding groove 217 are connected and arranged in a Y-shaped pattern. The first guiding groove 211 and the third guiding groove 217 are connected in the absence of any differential segment. The extending direction of the third guiding groove 217, the moving direction D1 and the ejecting direction D2 are parallel. In the embodiment, the second end portion 42 of the positioning element 40 is located in the third guiding groove 217 when the guiding element 20 is located at the ejecting position A. The displacement of the guiding element 20 is increased because of the third guiding groove 217; hence, the displacement of the guiding element 20 from the ejecting position A to the engagedly fixed position B is optimized so as to adapt to the dimensions of the chip 50 inserted into the push-push fixing structure.

Figure 8:
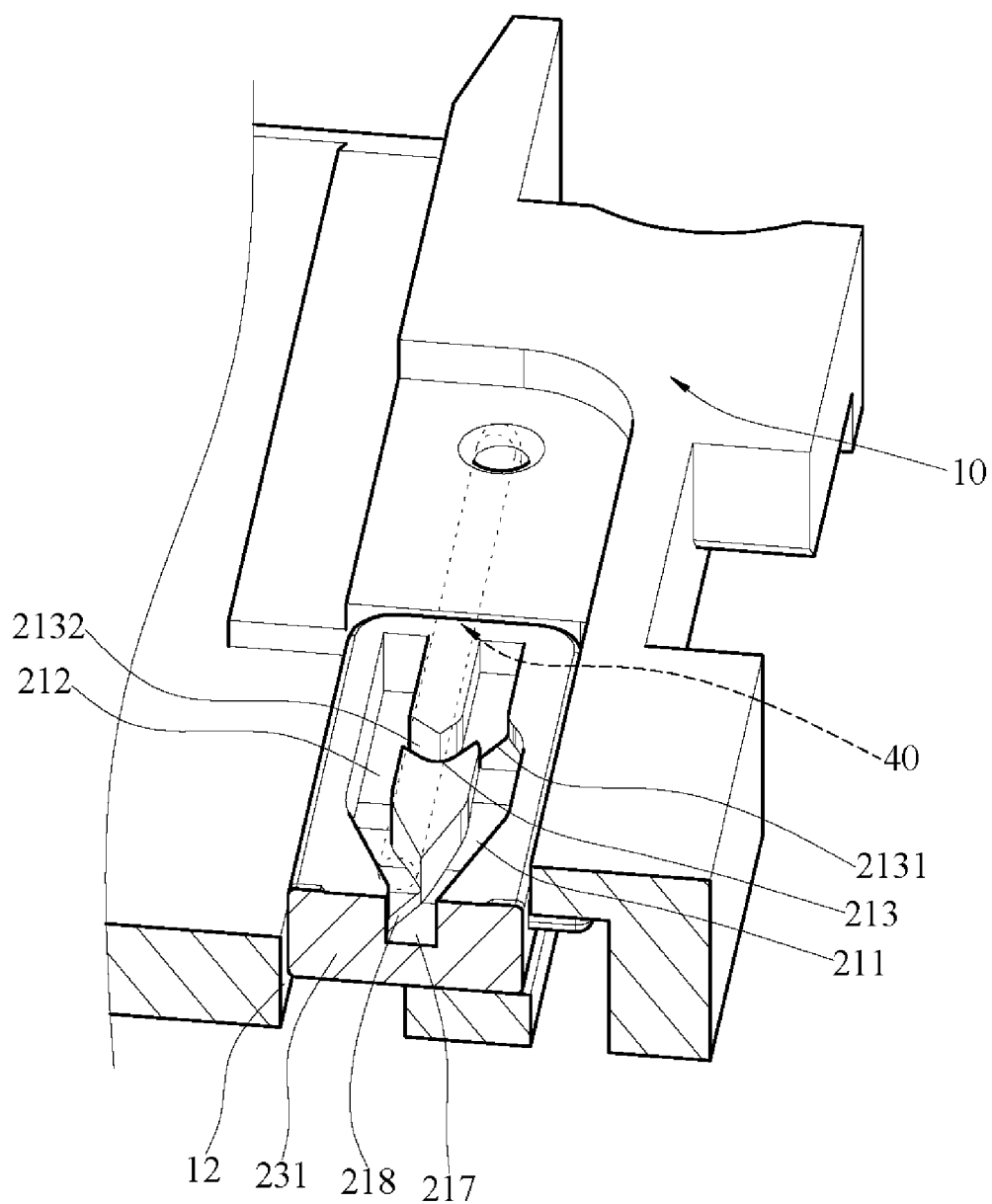
FIG. 8 is a cross-sectional view taken along line 8-8 of FIG. 6.

Referring to FIG. 8, the guiding groove 21 of the guiding element 20 further comprises a fourth differential segment 218. The fourth differential segment 218 is disposed between the second guiding groove 212 and the third guiding groove 217. The junction of the third guiding groove 217 and the fourth differential segment 218 is lower than the junction of the second guiding groove 212 and the fourth differential segment 218. Therefore, the fourth differential segment 218 is capable of stopping the positioning element 40. As a result, the positioning element 40 is restricted to one-way movement from the third guiding groove 217 into the first guiding groove 211 in the course of the transit of the guiding element 20 from the ejecting position A to the engagedly fixed position B. Due to the differential segments of the guiding groove 21, which are located at different heights, the path of movement of the positioning element 40 is well-defined, thereby enhancing operational certainty.

Figure 9:
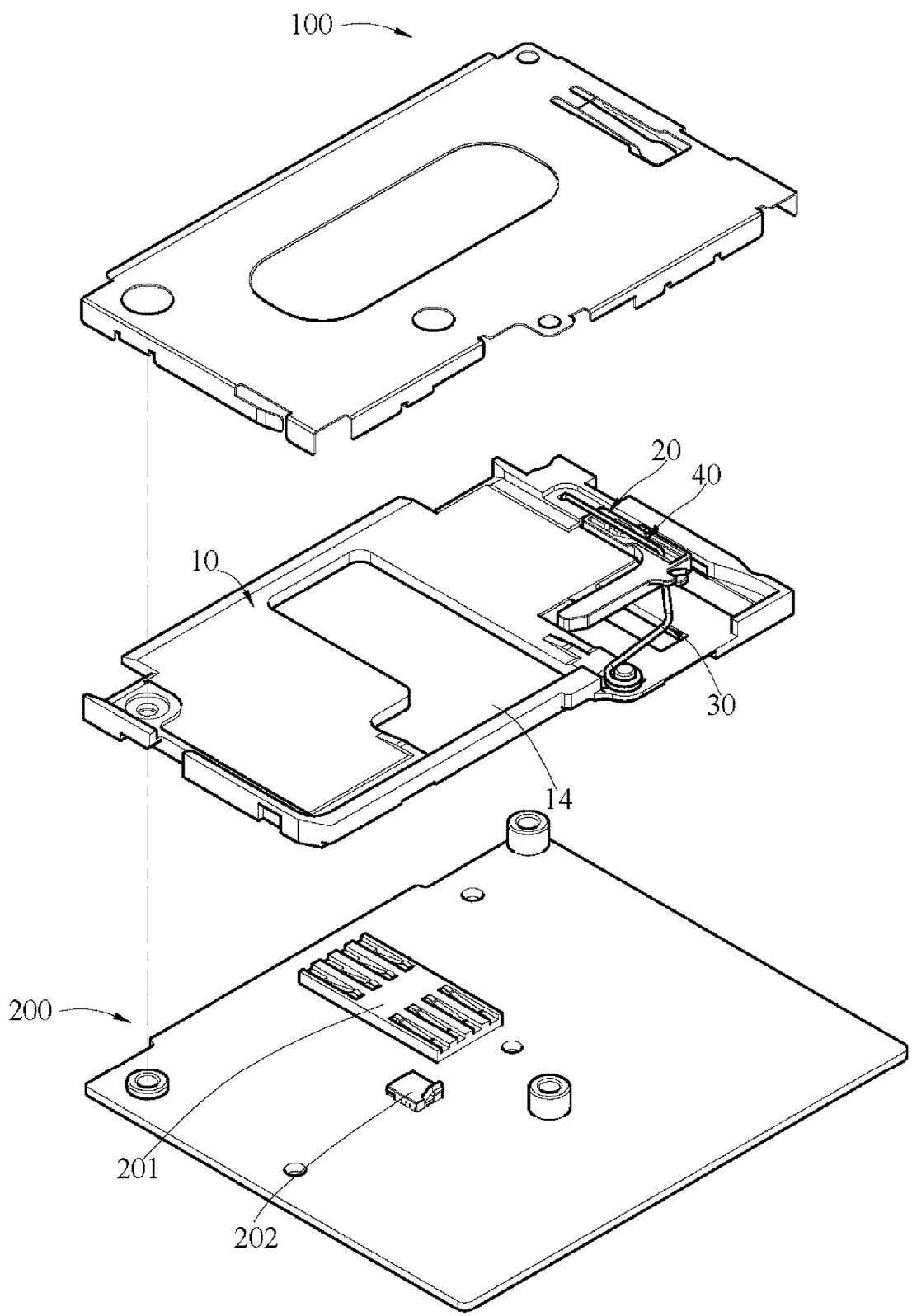
FIG. 9 is a schematic view the push-push fixing structure operating in conjunction with a circuit board according to the embodiment of the present invention.

Referring to FIG. 9, the push-push fixing structure of the present invention operates in conjunction with a circuit board 200 to provide a chip detecting module. In the embodiment, the base 10 further comprises an opening 14. The circuit board 200 has a chip connector 201. The base 10 of the push-push fixing structure is disposed on the circuit board 200. The opening 14 of the base 10 corresponds in position to the chip connector 201. Therefore, the chip 50 inserted between the base 10 and the cover 100 is electrically connected to the circuit board 200 through the opening 14, so as to provide the chip detecting module in its entirety.

The push-push fixing structure of the present invention is independent of the circuit board 200; hence, depending on the space available, the circuit board and the push-push fixing structure are each not only configured freely and thus optimally, but also achieve a high space utilization rate.

The circuit board 200 further comprises a security detecting switch 202. The security detecting switch 202 is a micro switch and capable of determining whether to turn on or turn off the chip connector 201. If the chip 50 is not inserted between the base 10 and the cover 100, the security detecting switch 202 will not be pressed and triggered; hence, the chip connector 201 will not be turned on. If the chip 50 is inserted into the slot 101 and thus between the base 10 and the cover 100, the chip 50 will press against the guiding element 20 in the moving direction D1 so that the chip 50 will press against the chip connector 201 and the security detecting switch 202 gradually while the guiding element 20 is moving toward the engagedly fixed position B. Once the guiding element 20 arrives at the engagedly fixed position B, the chip 50 will trigger the security detecting switch 202 so that the security detecting switch 201 enables the electrical conduction and thus electrical connection between the chip connector 201 and the chip 50. Therefore, not only does the security detecting switch 201 ensure that the chip 50 will operate in conjunction with the chip connector 201 after being positioned in place, but the security detecting switch 201 also determines that the chip connector 201 is to be turned off as soon as it senses the detachment of the chip 50. Therefore, an electronic device inclusive of the circuit board 200 neither ends up with a short circuit nor loses data otherwise stored in the chip 50 even though the chip 50 is inserted or removed, regardless of whether the electronic device is operating or is subjected to a power interruption. Therefore, the push-push fixing structure of the present invention enhances the security and ease of use of the electronic device.

Although the present invention is disclosed above by embodiments, the embodiments are not restrictive of the present invention. Changes and modifications made by persons skilled in the art to the embodiments without departing from the spirit of the present invention must be deemed falling within the scope of the present invention. Accordingly, the legal protection for the present invention should be defined by the appended claims.

What is claimed is:

1. A push-push fixing structure for fixing a chip, the push-push fixing structure operating in connection with a circuit board comprising a chip connector, the push-push fixing structure comprising:
   a base comprising a bottom surface contacting the circuit board and a top surface opposite thereto;
   a cover, wherein the base and the cover define a slot for receiving the chip;
   a guiding element disposed in the base and comprising a first guiding groove, a second guiding groove and a positioning portion, with the first guiding groove connected to the second guiding groove, with the positioning portion located at a junction of the first guiding groove and the second guiding groove;
   a resilient component disposed on the base and pressing against the guiding element; and
   a positioning element having a first end portion and a second end portion opposing the first end portion, with the first end portion disposed on the base and the second end portion slidably disposed in the first guiding groove and the second guiding groove of the guiding element;
   wherein, when the guiding element is moved under a push force to an engagedly fixed position, the second end portion of the positioning element slides along the first guiding groove and the second guiding groove until it becomes positioned at the positioning portion;
   wherein the base comprises an opening through the bottom surface thereof, the opening exposing the circuit board and corresponding to the chip connector, wherein a top surface of the chip connector is substantially coplanar with the top surface of the base; and
   wherein, when the chip is fully inserted into the slot, the chip forms a direct electrical connection with the chip connector through the opening in the base.

2. The push-push fixing structure of claim 1, wherein the positioning portion comprises a first guiding segment and a second guiding segment, the first guiding segment adjoining the first guiding groove, the second guiding segment adjoining the second guiding groove, with an included angle defined between an extending direction of the first guiding segment and an extending direction of the second guiding segment.

3. The push-push fixing structure of claim 2, wherein the included angle between the extending direction of the first guiding segment and the extending direction of the second guiding segment is less than 90 degrees.

4. The push-push fixing structure of claim 2, wherein a first differential segment is disposed between the first guiding groove and the first guiding segment.

5. The push-push fixing structure of claim 4, wherein a junction of the first guiding segment and the first differential segment is lower than a junction of the first guiding groove and the first differential segment.

6. The push-push fixing structure of claim 5, wherein a second differential segment is disposed between the first guiding segment and the second guiding segment.

7. The push-push fixing structure of claim 6, wherein a junction of the second guiding segment and the second differential segment is lower than a junction of the first guiding segment and the second differential segment.

8. The push-push fixing structure of claim 7, wherein a third differential segment is disposed between the second guiding segment and the second guiding groove.

9. The push-push fixing structure of claim 8, wherein a junction of the second guiding groove and the third differential segment is lower than a junction of the second guiding segment and the third differential segment.

10. The push-push fixing structure of claim 1, wherein the guiding element further comprises a third guiding groove connecting the first guiding groove and the second guiding groove, allowing the first guiding groove, the second guiding groove and the third guiding groove to be connected and arranged in a Y-shaped pattern.

11. The push-push fixing structure of claim 10, wherein a fourth differential segment is disposed between the second guiding groove and the third guiding groove.

12. The push-push fixing structure of claim 11, wherein a junction of the third guiding groove and the fourth differential segment is lower than a junction of the second guiding groove and the fourth differential segment.

13. A chip fixing module for fixing a chip, comprising:
   a circuit board, the circuit board comprising a chip connector; and
   a push-push fixing structure comprising:
      a base comprising a bottom surface contacting the circuit board and a top surface opposite thereto, the base further comprising an opening through the bottom surface exposing the circuit board and corresponding to the chip connector, wherein a top surface of the chip connector is substantially coplanar with the top surface of the base;
      a cover, wherein the base and the cover define a slot for receiving the chip;
      a guiding element disposed in the base and comprising a first guiding groove, a second guiding groove and a positioning portion, with the first guiding groove connected to the second guiding groove, with the positioning portion located at a junction of the first guiding groove and the second guiding groove;
      a resilient component disposed on the base and pressing against the guiding element; and
      a positioning element having a first end portion and a second end portion opposing the first end portion, with the first end portion disposed on the base and the second end portion slidably disposed in the first guiding groove and the second guiding groove of the guiding element;

wherein, when the guiding element is moved under a push force delivered by the chip to an engagedly fixed position, the second end portion of the positioning element slides along the first guiding groove and the second guiding groove until it becomes positioned at the positioning portion;

wherein, when the chip is fully inserted into the slot, the chip forms a direct electrical connection with the chip connector through the opening in the base.

14. The chip fixing module of claim 13, wherein the circuit board further comprises a security detecting switch, and the opening corresponds to the security detecting switch, wherein the security detecting switch determines whether to turn on or turn off the chip connector by respectively detecting the presence or absence of the chip in the slot.

15. The chip fixing module of claim 13, wherein the positioning portion comprises a first guiding segment and a second guiding segment, the first guiding segment adjoining the first guiding groove, the second guiding segment adjoining the second guiding groove, with an included angle defined between an extending direction of the first guiding segment and an extending direction of the second guiding segment.

16. The chip fixing module of claim 15, wherein the included angle between the extending direction of the first guiding segment and the extending direction of the second guiding segment is less than 90 degrees.

17. The chip fixing module of claim 15, wherein a first differential segment is disposed between the first guiding groove and the first guiding segment.

18. The chip fixing module of claim 17, wherein:
a junction of the first guiding segment and the first differential segment is lower than a junction of the first guiding groove and the first differential segment;
a second differential segment is disposed between the first guiding segment and the second guiding segment;
a junction of the second guiding segment and the second differential segment is lower than a junction of the first guiding segment and the second differential segment;
a third differential segment is disposed between the second guiding segment and the second guiding groove; and
a junction of the second guiding groove and the third differential segment is lower than a junction of the second guiding segment and the third differential segment.

19. The chip fixing module of claim 13, wherein the guiding element further comprises a third guiding groove connecting the first guiding groove and the second guiding groove, allowing the first guiding groove, the second guiding groove and the third guiding groove to be connected and arranged in a Y-shaped pattern.

20. The chip fixing module of claim 19, wherein:
a fourth differential segment is disposed between the second guiding groove and the third guiding groove; and
a junction of the third guiding groove and the fourth differential segment is lower than a junction of the second guiding groove and the fourth differential segment.

\* \* \* \* \*